United States Patent [19]

Welsch et al.

[11] Patent Number: 5,244,428

[45] Date of Patent: Sep. 14, 1993

[54] METHOD FOR MANUFACTURING A STRIPLINE LASER

[75] Inventors: Wolfgang Welsch, Baldham; Hans Krueger, Munich; Norbert Wenzel, Erlangen; Hubert Grosse-Wilde, Neunkirchen; Wilfried Haas, Erlangen, all of Fed. Rep. of Germany

[73] Assignee: Siemens Aktiengesellschaft, Munich, Fed. Rep. of Germany

[21] Appl. No.: 935,968

[22] Filed: Aug. 27, 1992

[30] Foreign Application Priority Data

Aug. 28, 1991 [DE] Fed. Rep. of Germany ....... 4128596

[51] Int. Cl.$^5$ .............................................. H01J 9/38
[52] U.S. Cl. .......................................... 445/28; 445/59
[58] Field of Search ............................. 445/28, 58, 59

[56] References Cited

U.S. PATENT DOCUMENTS

| | | | |
|---|---|---|---|
| 3,860,310 | 1/1975 | Hochuli et al. | 445/59 X |
| 3,960,422 | 6/1976 | Shull | 445/28 X |
| 4,393,506 | 7/1983 | Laskmann et al. | 445/58 X |
| 4,939,738 | 7/1990 | Opower | 372/95 |

FOREIGN PATENT DOCUMENTS 3729053  3/1989  Fed. Rep. of Germany .

Primary Examiner—Kenneth J. Ramsey
Attorney, Agent, or Firm—Hill, Steadman & Simpson

[57] ABSTRACT

A method for manufacturing a stripline laser which is composed of a plurality of constituent parts assembled together with at least two of the parts being soldered to one another, characterized by the step of soldering being by a soft solder, subsequently cleaning the interior of the assembled laser by subjecting it to the influence of a plasma treatment, continuing the plasma treatment to passivate the interior surfaces of the assembled parts of the laser, and limiting the temperature of the parts joined together by the soft solder to, at most, 150° during each of the plasma treatments. The method is particularly suitable for utilization to form a $CO_2$ stripline laser, and includes adding a $CO_2$ gas during the second or continued plasma treatment for passivating the surfaces by saturating them with $CO_2$.

8 Claims, 1 Drawing Sheet

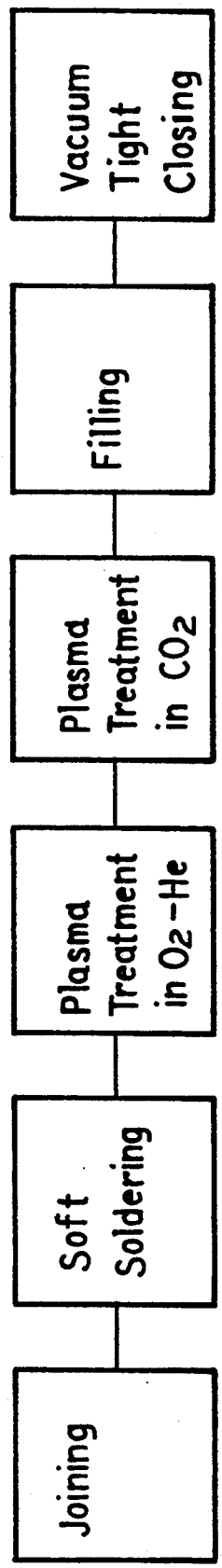

METHOD FOR MANUFACTURING A STRIPLINE LASER

BACKGROUND OF THE INVENTION

The present invention is directed to a method for manufacturing a stripline laser which is composed of a plurality of constituent parts including a housing and a discharge space which is preferably a rectangular cross section. The method includes soldering at least two of the parts together when joining the parts together.

U.S. Pat. No. 4,939,738, whose disclosure is incorporated herein by reference thereto and which priority from German Application 37 29 053, discloses a stripline laser which is formed by a plurality of parts which are joined together.

SUMMARY OF THE INVENTION

The object of the present invention is to provide a method for manufacturing a stripline laser composed of a plurality of parts, which method involves a low manufacturing cost or outlay and provides a stripline laser with a lengthened operating duration, which is beyond 10,000 hours of operation.

To accomplish these goals, the present invention is directed to an improvement in a method of manufacturing a stripline laser that is composed of a plurality of constituent parts defining a discharge space which is preferably a rectangular cross section and a housing, said method including soldering together at least two of said parts. The improvements are that the step of soldering uses a soft solder, subsequent to the soft soldering, cleaning the interior of the laser by exciting a plasma therein to create a plasma treatment, subsequently treating the interior of the laser with a second plasma treatment in a gas composition that is harmless for the operation of the laser to passivate the interior of the laser and limiting the temperature of the parts joined by the soft soldered to a temperature below approximately 150° C. during each plasma treatment.

Utilizing soft soldering as a solder connection in a laser is not possible without further ado. After a soft soldering process, water residues, hydrocarbons and other contaminants will remain in the laser, and these contaminants cannot be baked out at a maximally allowable temperature of the soft solder points, which is approximately 150° C. A cleaning and baking to remove the contaminants has succeeded, according to the present invention, in that the interior of the laser is first cleaned in an oxidizing atmosphere with a separate plasma treatment and is then subsequently passivated in a gas composition that is harmless for the operation of the laser. Given $CO_2$ stripline lasers, a plasma that contains $O_2$ is suitable for the cleaning operation, and this advantageously occurs by excitement between an electrode, which is at an above-ground potential, and the housing. Insofar as this is not possible, the use of an auxiliary electrode that can remain in the laser is recommended.

The excitation of the plasma advantageously occurs without electrodes on the basis of a pulsed HF having a frequency that can extend up to the GHz range.

In addition to cleaning, the first plasma treatment in an atmosphere containing $O_2$ is preferably composed of pure oxygen or a mixture of oxygen and helium will also effect a forming on the inside walls. In the second plasma treatment in the case of a $CO_2$ laser, $CO_2$ is advantageously blown in and the plasma treatment is continued until the interior of the housing has been completely passivated, for example so that the exposed surfaces are saturated with $CO_2$ and, therefore, no longer will produce any change in the $CO_2$ concentration in the laser housing during operation of the laser.

An advantageous development is that the plasma that produces the intense ultraviolet radiation in the wavelength below 200 nm is excited in the laser. This produces an especially fast and thorough cleaning. Parts especially highly exposed to the laser plasma during operation, such as, for example, electrodes, are advantageously separately exposed to the desired plasma treatment. As a result thereof, these are cleaned and passivated to an especially pronounced degree.

Other advantages and features of the invention will be readily apparent from the following description of the preferred embodiments, the drawing and claims.

BRIEF DESCRIPTION OF THE DRAWINGS

The FIGURE is a flow sheet for the method of the present invention.

DESCRIPTION OF THE PREFERRED EMBODIMENTS

The principles of the present invention are particularly useful in a method for assembling parts to form a laser. In this method, the laser parts are assembled in the usual way. Inventively, at least one part of the laser parts is joined to another by a soft soldering. After the soft soldering, a plasma treatment in a gas containing $O_2$ is implemented. This gas, if needed, may contain helium or other similar additives which will guarantee the optimum oxidation rate. As a result of this treatment, the walls are cleaned and formed, i.e., oxidized. On the basis of an additional plasma treatment in a $CO_2$ for a $CO_2$ laser, additionally, the walls are passivated, for example $CO_2$ is agglomerated to the walls up to the saturation, so that no change in the partial $CO_2$ pressure in the laser will occur during later operations of the closed laser. After this treatment, the laser can be filled and closed vacuum-tight.

Although various minor modifications may be suggested by those versed in the art, it should be understood that we wish to embody within the scope of the patent granted hereon all such modifications as reasonably and properly come within the scope of our contribution to the art.

We claim:

1. In a method for manufacturing a stripline laser, which is composed of a plurality of constituent parts including a discharge space, which preferably have a rectangular cross section, and a housing, said method including the steps of joining said parts together to form said laser with said step of joining including at least two parts being soldered together, the improvements comprising said soldering using a soft solder, subsequent to joining the parts together to form the laser, cleaning the interior of the laser by exciting a plasma therein to create a plasma treatment, then subjecting the interior to an additional plasma treatment in a gas composition which is harmless for the operation of the laser to passivate the interior surfaces of the laser and limiting the temperature of the parts of the laser which are soft soldered together to below approximately 150° C. during each of the plasma treatment steps.

2. In a method according to claim 1, wherein during the step of cleaning, the plasma contains $O_2$, which is excited in the laser.

3. In a method according to claim 1, wherein the step of exciting the plasma is by an exciting between electrodes not lying at ground potential and the housing.

4. In a method according to claim 1, wherein the laser has at least one auxiliary electrode for exciting the plasma, and the step of exciting the plasma is by exciting between said auxiliary electrode and the housing.

5. In a method according to claim 1, wherein the step of exciting the plasma is done with an electrode-free excitation with a pulsed HF which extends into the GHz range.

6. In a method according to claim 1, wherein the plasma in the second plasma step utilizes a $CO_2$ gas for passivating the interior of the laser and the gas pressure is selected so that the walls of the laser are saturated with $CO_2$.

7. In a method according to claim 1, wherein the step of exciting the plasma excites the plasma to generate an intense ultraviolet radiation in the wavelength range below 200 nm.

8. In a method according to claim 1, which includes separate plasma treatments for various parts including the electrodes which are especially exposed to the laser plasma during operation.

* * * * *